(12) United States Patent
Chevalier et al.

(10) Patent No.: US 8,079,308 B1
(45) Date of Patent: Dec. 20, 2011

(54) RAMJET ENGINE INCORPORATING A TUBULAR STRUCTURE AND A MISSILE PROPELLED BY A RAMJET ENGINES OF THIS TYPE

(75) Inventors: Alain Chevalier, Bourges-Asnieres (FR); Thierry Hachin, Neuvy sur Barangeon (FR); Jacques Raynaud, Savigny sur Orge (FR)

(73) Assignee: Aerospatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 07/421,633

(22) Filed: Oct. 12, 1989

(30) Foreign Application Priority Data

Oct. 12, 1988 (FR) ...................... 88 13413

(51) Int. Cl.
*F42B 15/00* (2006.01)
(52) U.S. Cl. .......................................... 102/380; 60/245
(58) Field of Classification Search .................. 102/374, 102/380, 503; 60/245
See application file for complete search history.

(56) References Cited

U.S. PATENT DOCUMENTS

| | | | | |
|---|---|---|---|---|
| 2,935,946 A | * | 5/1960 | Gallo et al. | 102/374 |
| 3,173,249 A | * | 3/1965 | Wiggins | 60/245 |
| 3,684,215 A | * | 8/1972 | Jacobson et al. | 244/3.27 |
| 4,176,607 A | * | 12/1979 | Kishi et al. | 102/374 |
| 4,332,631 A | * | 6/1982 | Herty, III et al. | 60/207 |
| 4,384,454 A | * | 5/1983 | Engl | 60/245 |
| 4,391,094 A | * | 7/1983 | Engel et al. | 60/245 |
| 4,441,312 A | * | 4/1984 | Smith | 60/245 |

FOREIGN PATENT DOCUMENTS

| | | | | |
|---|---|---|---|---|
| DE | 3407901 | * | 9/1985 | 60/245 |
| GB | 590177 | * | 7/1947 | 60/245 |
| GB | 1417350 | * | 12/1975 | |
| GB | 1421719 | * | 1/1976 | |
| GB | 2104628 | * | 2/1984 | |
| GB | 2218494 | * | 11/1989 | |
| JP | 131846 | * | 8/1982 | 60/245 |

* cited by examiner

*Primary Examiner* — Stephen M Johnson
(74) *Attorney, Agent, or Firm* — Dickinson Wright PLLC

(57) ABSTRACT

A ram jet engine including a combustion chamber ending in a gas injection nozzle, a cruising propulsion unit fee ding liquid propellant into the combustion chamber, and at least one air duct for feeding air intended for combustion of the fuel in the combustion chamber. A rigid tubular element is incorporated into the ramjet engine, with an interior volume of the rigid tubular element being divided into two spaces by an intermediate transverse partition. One of the spaces houses the cruising propulsion unit while the other space houses the combustion chamber. Passages are cut into the intermediate transverse partition to allow feeding of liquid fuel into the combustion chamber, and the air duct is mounted on the tubular element to feed the combustion air through the tubular wall of the tubular element.

10 Claims, 13 Drawing Sheets

RAMJET ENGINE INCORPORATING A TUBULAR STRUCTURE AND A MISSILE PROPELLED BY A RAMJET ENGINES OF THIS TYPE

FIELD OF THE INVENTION

The present invention concerns ramjet engines and missiles propelled by these ramjet engines.

BACKGROUND OF THE INVENTION

Ramjet engines designed for missile propulsion are already well known. These engines, manufactured using steel or an aluminum alloy, have a complex structure and are heavy and costly.

SUMMARY OF THE INVENTION

The purpose of the present invention is to reduce the weight and cost price of such ramjet engines and to simplify their structure, in particular by eliminating a large number of mechanical connections while still obtaining a high degree of rigidity.

To achieve these goals, according to the invention, the ramjet engine includes a combustion chamber ending in a gas-ejection nozzle, a cruising propulsion unit which feeds gaseous fuel into the combustion chamber, and at least one air duct which feeds air intended for combustion of the fuel into said combustion chamber, with the ramjet engine containing a rigid tubular element whose interior volume is divided into two spaces by an intermediate transverse wall. One of the spaces houses the cruising propulsion unit while the space houses the combustion chamber. Passages are cut into the intermediate transverse wall to permit feeding of gaseous fuel into the combustion chamber, and the air duct is mounted on the tubular element so as to feed combustion air through the tubular wall of the tubular element.

It will be seen that an especially simple, inexpensive, and rigid ramjet-engine structure may thus be obtained.

The tubular element is advantageously made of a composite material formed from resistant fibers, for example, glass or carbon fibers, coated with a polymerizable synthetic resin, for example, epoxy, phenolic, PSP, or polyimide. Production of a tubular element of this kind entails the application of conventional techniques for the manufacture of volumes by filament winding on a mandrel using resistant fibers impregnated with a hardenable resin.

Thus, because of the use of such winding techniques for the production of a ramjet engine, not only is advantage gained from the use of composite filament-based materials providing outstanding mechanical properties for a density less than that of metals, but, in addition, the original design features of this invention may be embodied in a simpler, lighter, and less costly ramjet-engine.

For example, as will be seen below, the filament-winding technique makes possible the incorporation of a large number of components, such as the nozzle, thermal protective linings, and intermediate wall, in a single operation, thereby simplifying ramjet-engine manufacture. Moreover, the use of a composite material for the production of the engine has been proposed which allows the simple implementation of the pyrotechnical process for cutting the apertures through which the air ducts open into a combustion chamber. When, according to conventional practice the ramjet engine contains a consumable accelerator which, when installed in the combustion chamber, is designed to impart initial propulsion to the missile, the process makes it possible to cut the apertures only when the cruising propulsion unit is ignited, upon completion of the combustion of the accelerator. Thus, problems of a weakened structure inhering in the existence of the apertures and aggravated by the high pressure generated by said accelerator are eliminated.

Of course, the specifications of the tubular element allow it to bear the operating stresses of the ramjet engine, in particular the combustion pressures of the engine and of the optional consumable accelerator, as well as the structural stresses (resistance, rigidity) linked to the missile. Furthermore, as is customary for conventional metal ramjet engines, a thermal protection lining is provided on the interior walls of the tubular element, at least in the space corresponding to the combustion chamber.

It will be noted that, because of the present invention, the various elements, such as the intermediate transverse wall, the thermal protection lining, the nozzle, the optional consumable accelerator, and the cruising propulsion unit, may be joined to the tubular element in various ways.

For example, the above-noted elements may be attached by bonding or mechanical attachment, or may be molded within the tubular element. Alternatively, such elements may be positioned on a winding mandrel of the tubular elements and thus incorporated into the tubular element during the manufacture by filament winding.

It is also possible for the elements to be built simultaneously at their intended locations within the tubular elements so as to form a monolithic assembly. This being the case when the materials composing the various components are similar composite materials.

Additionally, in accordance with the present invention, the components may be grouped into two sub-assemblies so as to obtain first a "combustion-chamber" sub-assembly made up of the intermediate transverse wall, the thermal protection linings, and the ramjet nozzle; and second, a "cruising propulsion-unit" sub-assembly composed of components corresponding to the type of ramjet engine chosen.

The above sub-assemblies are then inserted and attached on the inside of the tubular element, thereby ensuring the mechanical solidity of the assembly, with the last manufacturing technique being recommended for the cruising propulsion unit, which may then be incorporated into a sub-structure manufactured by using filament winding.

The special nature of the "cruising propulsion-unit" sub-assembly design, which consists of a wound volume which is slid into and fastened to the interior of the tubular element, makes it possible to have a single main structure for several different types of ramjet engines.

For example, one type of ramjet engine may be a simple ramjet engine in which said sub-assembly contains a semi-solid propellant block for cruising and, consequently, can be molded and bonded onto the tubular element.

However, it is also possible in accordance with the present invention to provide a gas-generating ramjet engine generally termed "separate" engine in which the sub-assembly contains, in addition to the free semisolid propellant block, an ignition system and sonic injectors.

It is also possible to provide a liquid-fuel ramjet engine, in which said sub-assembly comprises a fuel tank, including a fluid-driving generator and injection system.

The intermediate traverse partition may, in accordance with the present invention, be made directly unitary with the rigid tubular element or, inversely, the intermediate transverse partition may be made unitary with the rigid tubular element by of one of the two assemblies, for example, the "cruising propulsion unit" and the "combustion chamber."

It is also possible for at least one of the two sub-assemblies constituted in the cruising propulsion unit and the combustion chamber to be manufactured interiorally of the tubular element, or as an alternative, at least one of the assemblies may be manufactured as a module, installed, and attached with the tubular element.

In accordance with still further features of the present invention, the tubular element may be constructed around at least two assemblies made up of the cruising propulsion unit and at the combustion chamber and the tubular element may, for example, incorporate inserts for attachment of the air ducts.

The inserts are advantageously provided to attach the ends of the air ducts to the tubular element in an area of the combustion chamber and may be made unitary with the intermediate transverse partition.

Additionally, the combustion chamber may, in accordance with the present invention, incorporate a consumable accelerator and the inserts for attaching the ends of the air ducts to the tubular element in the vicinity of the combustion chamber may shaped so as to form cutting knives so as to enable a cutting of airfeed-apertures in the walls of the tubular element at an appropriate moment.

BRIEF DESCRIPTION OF THE DRAWINGS

The above and other objects, features, and advantages of the present invention will become more apparent from the following description when taken in connection with the accompanying drawings, which show, for the purposes of illustration only, several embodiments in accordance with the present invention, and wherein.

DETAILED DESCRIPTION

Figure 1:
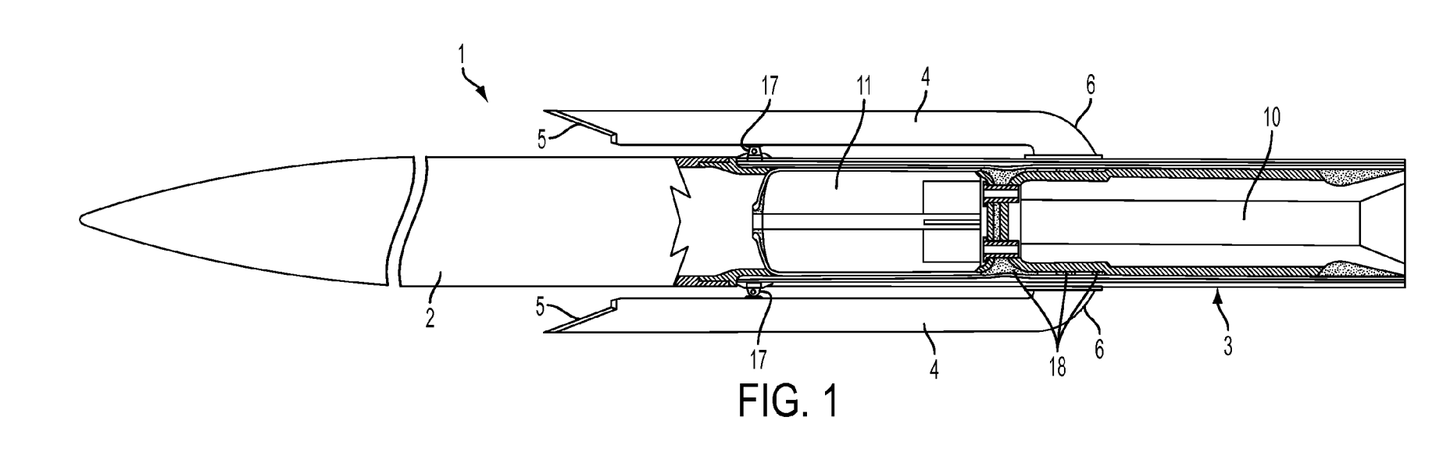
FIG. 1 is a partial longitudinal cross-sectional view of a missile equipped with a ramjet engine constructed in accordance with the present invention.

Referring now to the drawings wherein like reference numerals are used throughout the various views to designate like parts and, more particularly, to FIG. 1, according to this figure, a missile, constructed in accordance with the present invention, includes a body 2 rigidly extended toward a rear by a ramjet engine 3 for providing a propulsion for the missile 1. The body 2 includes the usual devices and loads, which are not represented since they are unrelated to the invention.

Air ducts 4 are arranged on the circumference of the missile 1 and are attached to the ramjet engine. Each of these ducts incorporates, toward the front, an air intake 5 and, toward the rear, a bend 6 allowing its attachment to the exterior wall of the ramjet engine 3.

Figure 2:
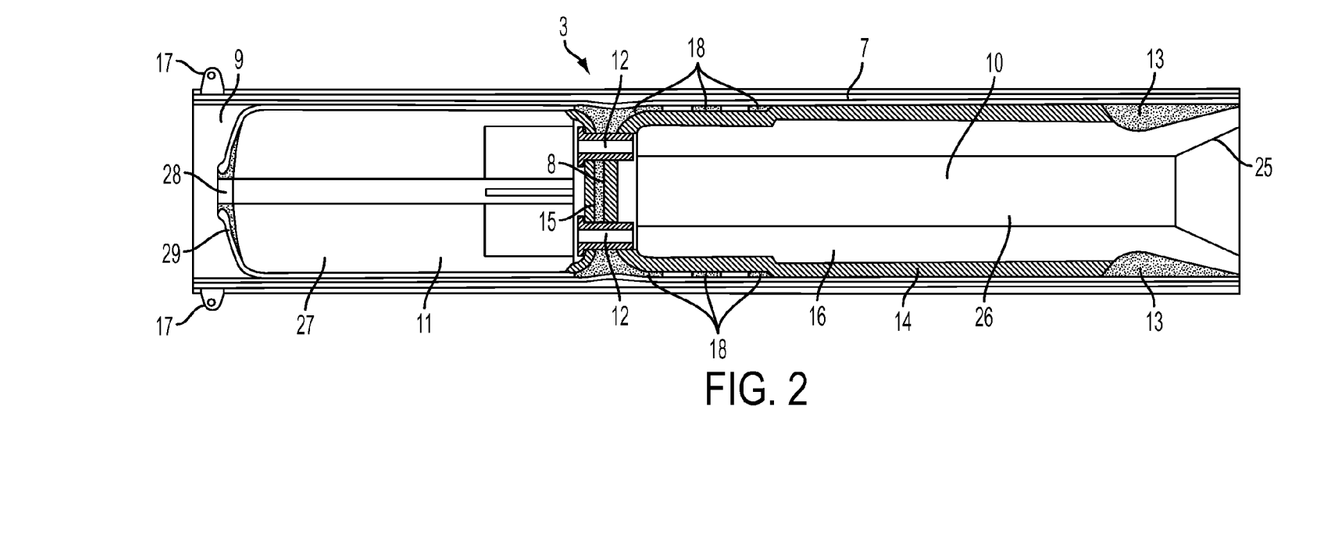
FIG. 2 is a longitudinal cross-sectional view, on an enlarged scale, of the ramjet engine of FIG. 1.

As will emerge clearly from the following description, the ramjet engine 3 according to the invention may be built according to a large number of variant embodiments, and may be constructed in several different ways. However, whatever the embodiment, the ramjet engine 3 comprises, as shown in FIG. 2, a rigid tubular element 7 made by the filament-winding on a mandrel of resistant fibers coated with a hardenable resin, with an intermediate transverse partition separating an interior volume of the tubular element 7 into two spaces 9, 10 with a forward space 9, housing the cruising propulsion unit 2, and with the rearward space 10 being adapted to house a combustion chamber of the ramjet engine 3. Passages 12 cut in the transverse partition in order to permit feeding of liquid fuel from the cruising propulsion unit 11 unit into the combustion chamber. A gas-ejection nozzle is fitted at the rear extremity of the rear space 10 opposite to the transverse partition 8. A thermal protection lining 14 covers at least the inner wall of the space 10 whereby the combustion chamber is formed from the nozzle 13 and the thermal protection lining 14.

In the embodiment shown in FIGS. 1 and 2, it has been assumed that a thermal protection lining 15 has also been formed on the surface of the transverse partition 8 facing the space 9 containing the cruising propulsion unit 11.

A consumable accelerator 16 may be installed on the inside of the combustion chamber 13, 14.

Furthermore, inserts 17 and 18 may be incorporated into the rigid tubular element for the purpose of attaching the air ducts on the ramjet engine. The inserts 17 are fitted onto the forward end of the tubular element and make it possible to attach the intermediate (or forward) part of the air ducts 4 (FIG. 1). On the other hand, inserts 18 are installed in the vicinity of the intermediate transverse partition 8, but just to the rear of it (i.e., facing the space 10 making up the combustion chamber) with the inserts 18 making it possible to make the rear extremities of the air ducts 4 unitary with the side wall of the tubular element 7 after the bends 6 in the ducts.

Figure 3:
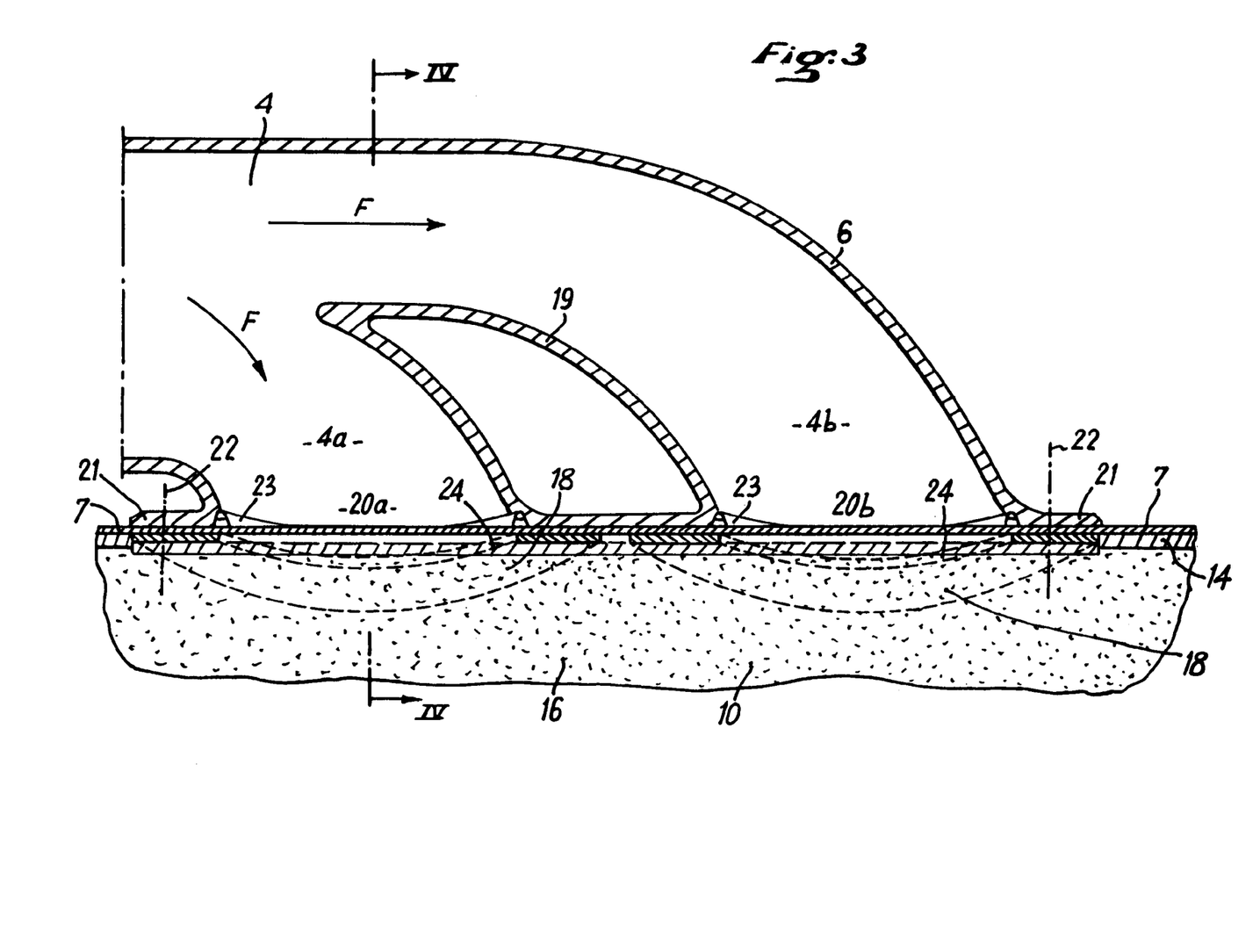
FIG. 3 is a partial cross-sectional view of an air duct disposed in a vicinity of the tubular element.
Figure 4:
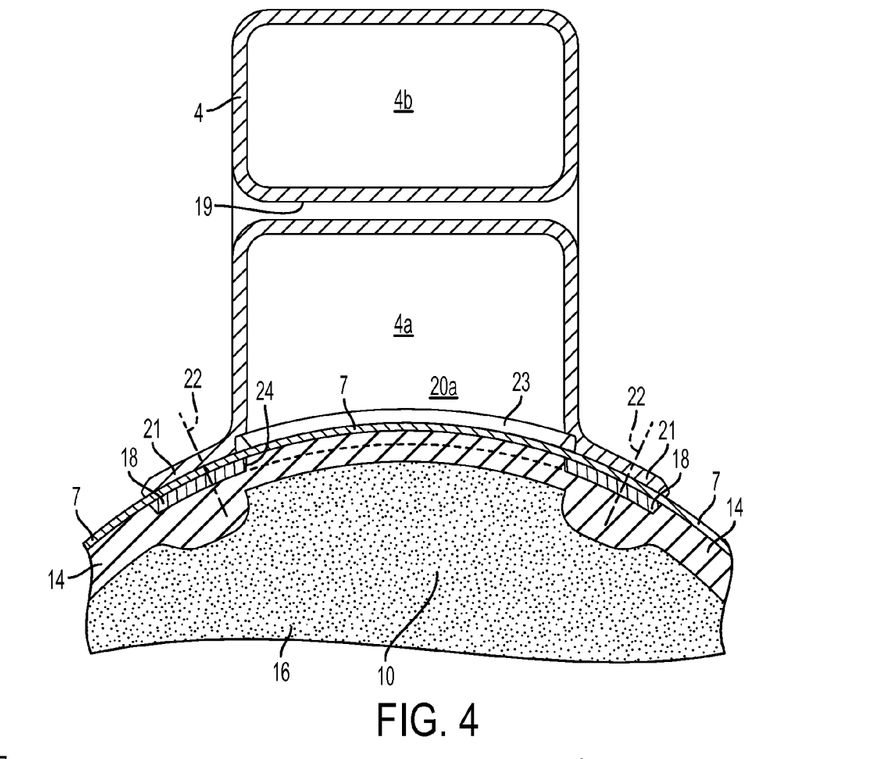
FIG. 4 is a cross-sectional view taken along line IV-IV in FIG. 3.

FIGS. 3 and 4 illustrate, on an enlarged scale, the attachments of the rear extremities of the air ducts 4 to the inserts 18. In FIGS. 3 and 4, it has been assumed that each air duct 4 contains, within its bend 6, an obstacle 19 dividing the air duct into two passages 4a and 4b, which each passage 4a, 4b emptying into the forward portion (just to the rear of the partition 8) of the combustion chamber 13, 14 through openings 20a and 20b, respectively.

The rear extremity of the air ducts 4 ends in a collar 21, which may be attached to the tubular element 7 using fastening means (only the axis 22 of which is shown for purposes of clarity) such as screws driven through the wall of the element 7 and the inserts 18.

Openings 20a and 20b may be drilled mechanically in the wall of the tubular element 7 prior to attachment of the air ducts 4 to the tubular element 7. These openings may preferably also be drilled in the wall at the precise moment when the cruising propulsion unit 11 in ignited in a conventional manner. In this case, pyrotechnic cutting fuses 23 are installed on the inner circumference of passages 4a and 4b and against the wall of the tubular element 7. The inserts 18, provided for attachment of the air ducts 4, are, in this case, ring-shaped, the inner circumference 24 of which acts as a knife for the cutting of the wall of the tubular element 7 by the pyrotechnic fuses 23. The missile 1 thus functions in the following manner: initially, since the ramjet engine 3 is not operational, the missile 1 is propelled by the consumable accelerator 16 (composed, for example, of a solid-propellant load) housed within the combustion chamber formed by the nozzle 13 and the lining 14.

When the accelerator 16 is operating, the air ducts 4 are blocked by the wall of the tubular element 7 sealing the openings 20a, 20b at the intake of the combustion chamber defined by the nozzle 13 and the lining 14. An acceleration nozzle 25, smaller than the nozzle 13 of the ramjet engine, is positioned at the outlet of the combustion chamber. The nozzle may be composed of a simple tube formed in the accelerator block 16.

When the accelerator 16 ceases operation, the acceleration nozzle 25 is ejected and the pyrotechnical fuses 23 are activated. The openings 20a and 20b are thus cut out, and air, flowing (arrow F) in the air ducts 4 through the openings 5, is drawn into the combustion chamber 13, 14, through the openings 20a and 20b created in this way.

Simultaneously, the cruising propulsion unit 11 is activated to ensure the continued propulsion of the missile 1, which has already been propelled by the consumable accelerator 16, until the flight is completed.

The intermediate transverse partition 8 may be made either of metal, or, preferably, of a fiber-resin composite material, having the same nature as that used to make the element 7. In the event that the intermediate partition is metal, it may form a monobloc hood in combination with the inserts 18.

The partition may be inserted and bonded to the inside of the polymerized tubular element 7 or inserted in the winding mandrel of the element and incorporated into the element during the winding of the composite material. Additionally, the partition may be manufactured using resin-impregnated fabrics set between two parts of the mandrel and incorporated into the tubular element 7 when the tubular element 7 is wound so that the entire unit is polymerized together to form a monolithic structure. Additionally, the partition may make up the front extremity of a secondary structure containing all of the components of the integrated accelerator 16.

Similarly, the nozzle 13 of the ramjet engine 3 may be inserted and bonded to the interior of the polymerized tubular element 7 or placed in the winding mandrel of the tubular element 7 and incorporated into the tubular element 7 when the composite material is wound. The nozzle 13 may also be formed directly on the mandrel by, for example, winding a fringe of resin-impregnated fireproof material of the type described in, for example, French Patent 8,412,782 of Aug. 14, 1982, or by positioning of specifically-oriented fabrics, then incorporated into the tubular element 7 when the tubular element is wound, with the entire unit being polymerized together so as to form a monolithic structure. It is also possible for the nozzle 13 to be made a part of a secondary structure comprising all of the components of the integrated accelerator 16.

The protective lining 14 may be installed in three different ways, with the first being a conventional approach, which is achieved by molding the protecting liner 14 on an interior of the tubular element 7 after a polymerization of the tubular element 7. It is also possible for the protective lining 14 to be molded around a mandrel polymerized and then wind the tubular element 7 on the assembly thus formed. In this situation, and if the desired thermal protection is silicone-based, a bonding layer must be laid down on what will be the surface of the thermal protection on which the winding of the tubular element 7 will take place. Additionally, the protective lining 14 may be installed by placing a layer several millimeters thick, for example, 4 to 12 mm of a fiber-resin material on the mandrel. The fibers may be made of silica or silicon carbide, and the resin must be compatible with that used in the tubular element 7.

This thermal protection may be installed by filament winding (incorporating the slightest possible angle to restrict ablation), by winding a fringe, or by encasing the mandrel in a three-dimensional fabric cover. The ramjet-engine nozzle 13 may also be formed simultaneously and using the same procedure.

The tubular element 7 is then wound on this thermal protection, and the unit thus formed is polymerized.

Finally, the thermal protection lining 14 may constitute part of a secondary structure comprising all of the elements of the integrated accelerator 16. It is then installed using one of the three methods previously described.

As was indicated above, the accelerator 16 is preferably of the solid-propellant type without added nozzle, consisting of a propellant block with a central channel 26 and a mouth 25 at the rear (forming a nozzle) which is molded and bonded in the combustion space 10 housing the combustion chamber. The choice of this type of accelerator is made in the interest of extreme simplicity of design. However, in the event that the disadvantages linked to the presence of a nozzle (i.e., greater complexity and ejection threatening the carrier) are not considered to rule out its use, the accelerator 16 may be fitted with a nozzle, this nozzle (not shown) being incorporated into the tubular element 7, then ejected when the accelerator 16 has burned up, for example, by pyrotechnic cutting.

In the embodiment represented in FIGS. 1 and 2, the cruising propellant element 11 is assumed to comprise a semi-solid propellant block 27 and an ignition system 28. In this case, the reduction gases burned in the chamber 9 of the ramjet engine are generated by the pyrolysis of the semi-solid propellant block 27 which has been molded and attached in the chamber, and are injected into the combustion chamber 10 through the large passages 12 cut in the intermediate partition 8.

The block 27 may be installed in the chamber 9 in any appropriate manner. However, the block will preferably be molded and bonded onto a secondary structure 29 (for example, a structure constructed by filament winding), which is then slid into position and bonded inside the chamber 9 of the tubular element 7.

It will be noted that the secondary structure 29 contains no rear extremity (in order to allow molding of the block 27), and that its side wall does not have to be furnished in order to withstand the operating pressure of the propulsion unit 11. Indeed, corresponding stresses are borne by the side wall of the tubular element 7, against which the secondary structure rests for support. On the other hand, the forward end of the secondary structure 20 is furnished so as to withstand the operating pressure of the propulsion unit.

Figure 5:
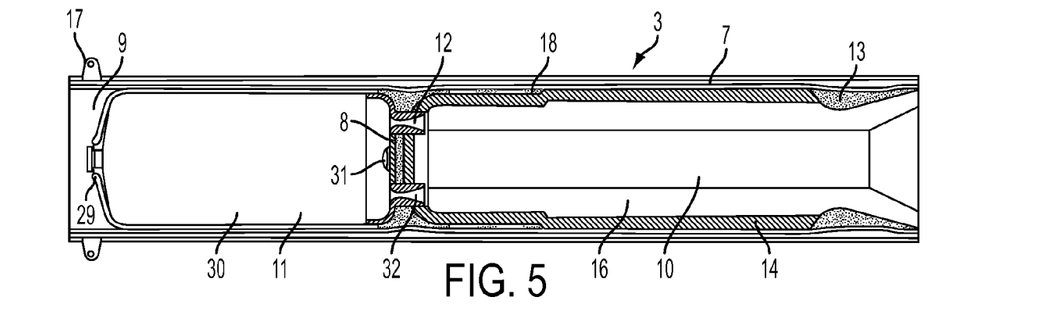
FIGS. 5 and 6 are cross-sectional views of other embodiments of the ramjet engine according to the invention.

FIG. 5 illustrates an embodiment of the ramjet engine 3, in which the cruising propulsion unit 11 is of the solid propellant type with separate gas generator. In this case, a semi-solid propellant block (which may be doped with boron), which generates the reducing gases serving as fuel for the ramjet engine, may be free. Consequently, it is simple to position it in the chamber 9. An ignition system 31 is provided, and the passages 12 cut in the partition 8 thus become sonic injectors 32. As before, a secondary structure 29 enclosing block 30 may be provided.

Figure 6:
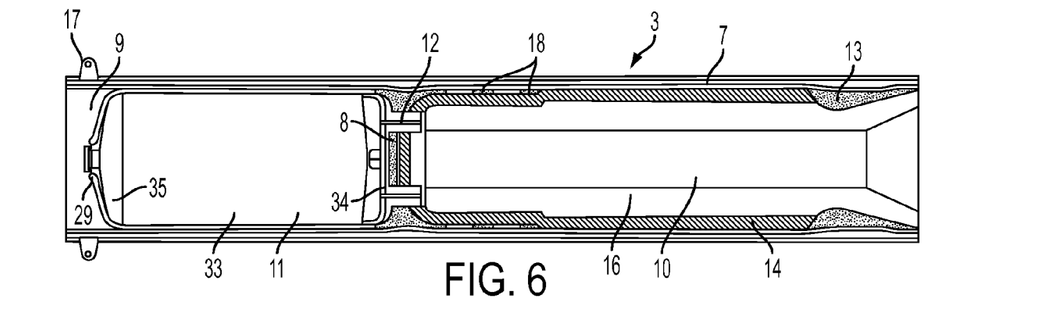

In the embodiment shown in FIG. 6, the cruising propulsion unit 11 comprises a tank 33 of liquid fuel, a system 34 for the injection of the fuel into space 10, and a system 35 which drives the fuel from the tank 33 to the injection system 34. Here again, the propulsion unit 11 may be installed in different ways, in particular using the secondary structure 29.

It will be noted that the construction of the propulsion unit 11, of whatever type, as a plug-in cartridge 29 is worthy of consideration, since it allows a standard elementary structure (comprising the tubular element 7, the wall 8, the nozzle 13, and the accelerator 16) to be equipped with the propulsion unit best suited to requirements.

Using FIGS. 7 through 19, an example of the process for constructioning the ramjet engine 3 shown in FIGS. 1 and 2 will be described below.

Figure 7:
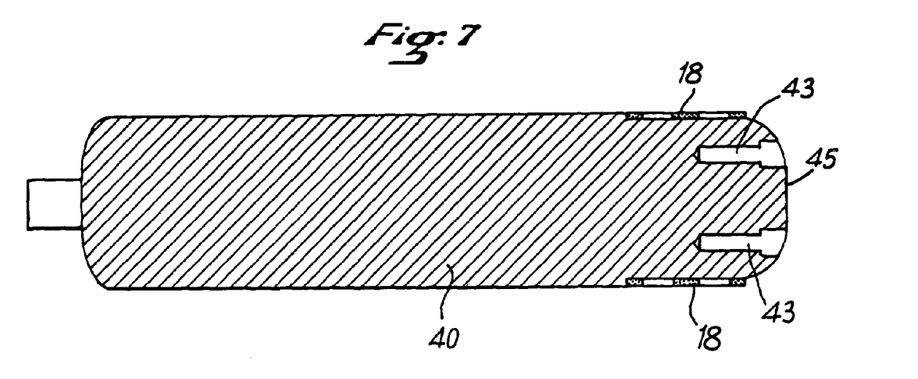
FIGS. 7 through 19 are diagrammatic illustrations of an example of a process for constructing the ramjet engine of FIGS. 1 and 2.

First, two cylindrical mandrels 40 and 41, having the same diameter, are readied; they may be made unitary coaxially, one mounted on the end of the other, because of a system of male 42 and female 43 plugs fitted respectively in the rear extremity 44 of the mandrel 41 and in the forward extremity 45 of the mandrel 40.

Figure 8:
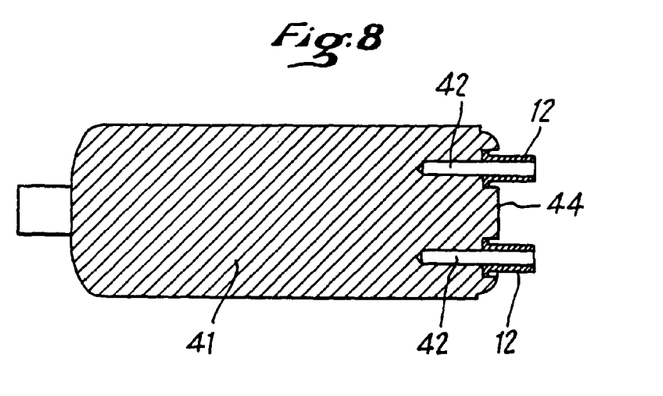

As will be understood from the following description, mandrels 40 and 41 correspond to chambers 10 and 9, respectively. Mandrel 40 has on its surface, in the vicinity of its forward extremity 45, indentations in which the inserts 18 (FIG. 7) are fitted. Furthermore, ceramic sleeve tubes designed to form passages 12 are positioned on the male plugs 42 (FIG. 8).

Figure 9:
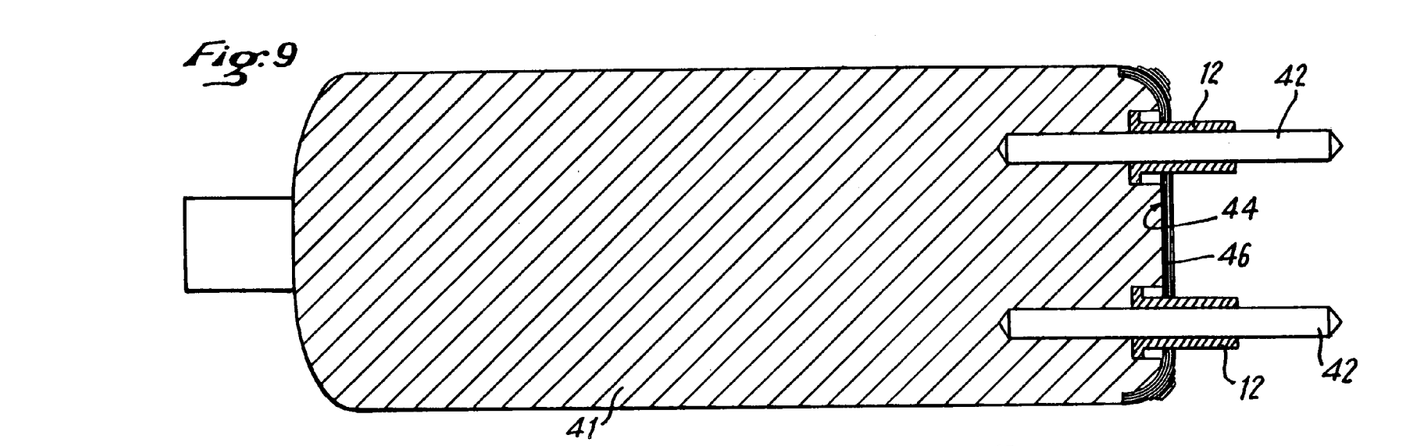
Figure 10:
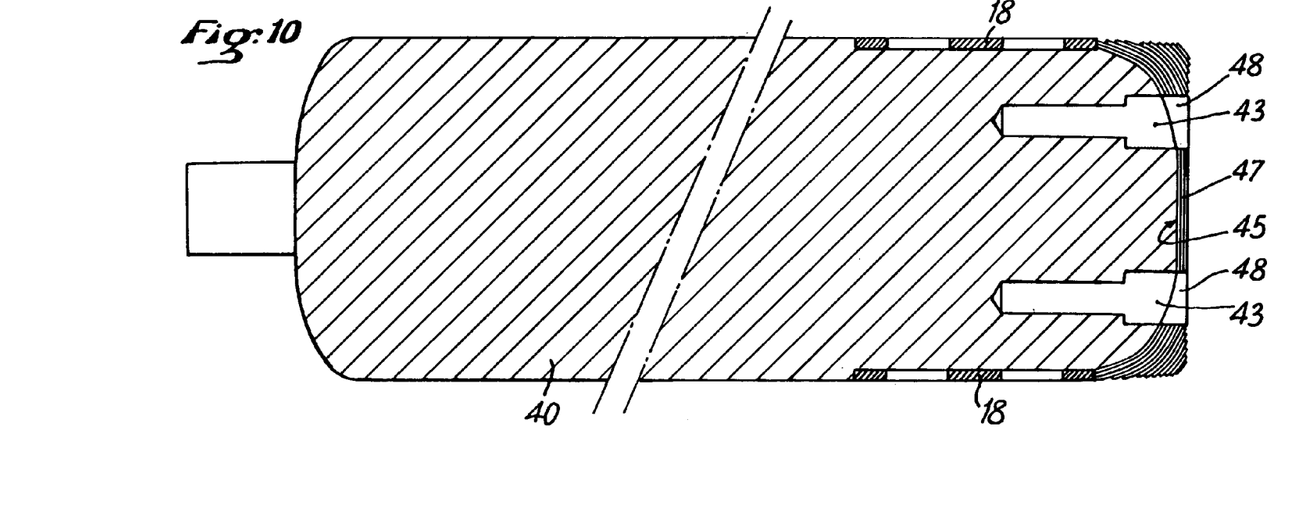

Next, layers 46 of fabric woven from resistant fibers impregnated with polymerizable resin are placed on the rear extremity 44 of mandrel 41. The sleeve tubes 12 protrude through these layers 46 (FIG. 9). In a symmetrical arrangement, layers 47 of fabric woven from resistant fibers impregnated with polymerizable resin are placed on the forward extremity 45 of mandrel 40, with the layers 47 being pierced with holes 48 opposite the female plugs 43 (FIG. 10).

Figure 11:
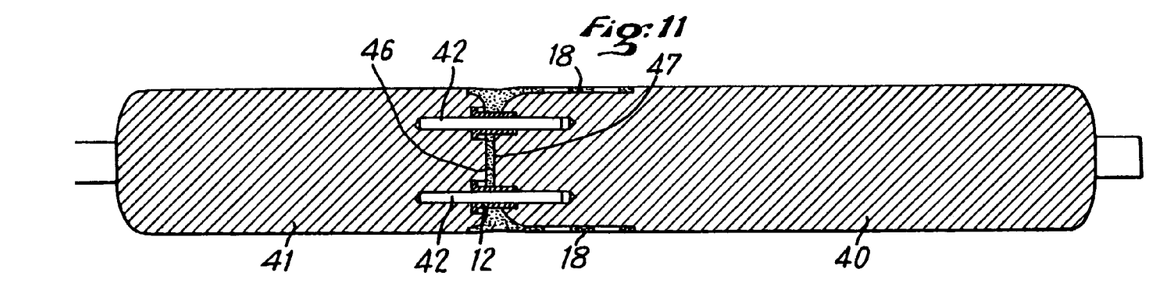

The two mandrels 40 and 41 are joined together one mounted on the end of the other, in such a way that the layers 46 and 47 are pressed together between the rear and forward surfaces 44, 45, respectively, so as to ultimately form the transverse partition 8. In this position, the portions of the sleeve tubes 12 protruding beyond the layers 46 pass through the holes 48 and are inserted into the female plugs 43 (FIG. 11).

Figure 12:
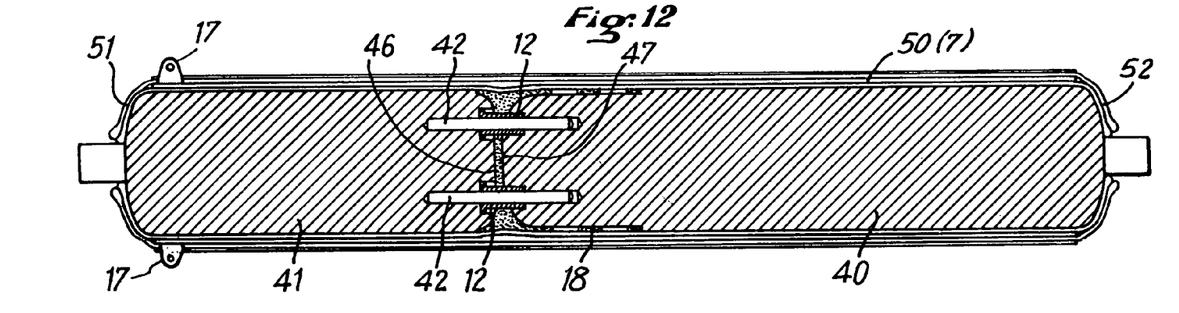

This assembly is placed on a bobbin winding machine, which creates on the joined mandrels 40 and 41 filament windings, for example, windings alternately polar and circumferential. Thus, a composite wall 50, made up of several layers and designed to form the tubular element 7, is obtained, in which metal inserts, such as, for example, the inserts 17 used to mount the air ducts 4, may be incorporated during winding (FIG. 12).

The entire structure thus obtained is polymerized, either in an oven or an autoclave, depending on the type of resin used.

Figure 13:
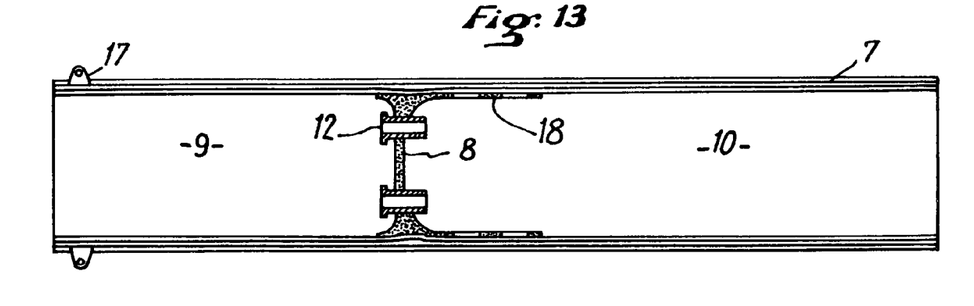
Figure 14:
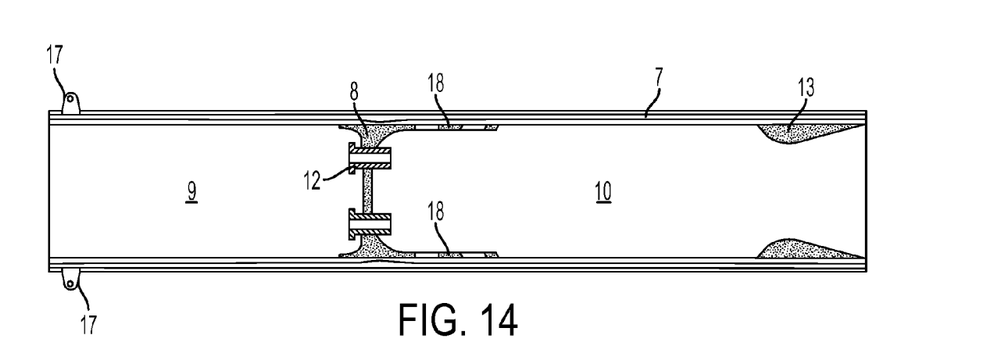

The wound extremities 51 and 52 are cut at the two ends, and the winding mandrels 40 and 41' removed. The structure 7, 8, 9, 10, 12, 17, and 18, illustrated in FIG. 13, is then obtained.

Figure 15:
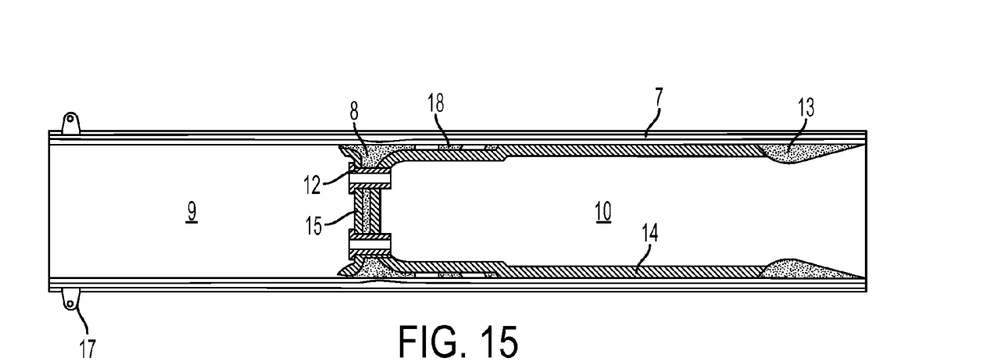

The nozzle 13 is then bonded to the rear of the chamber 10 of the structure (FIG. 14), and the thermal protective surfaces 14 and 15 are molded within the structure (FIG. 15). The acceleration propellant block 16 is molded in a similar manner (FIG. 16).

Figure 17:
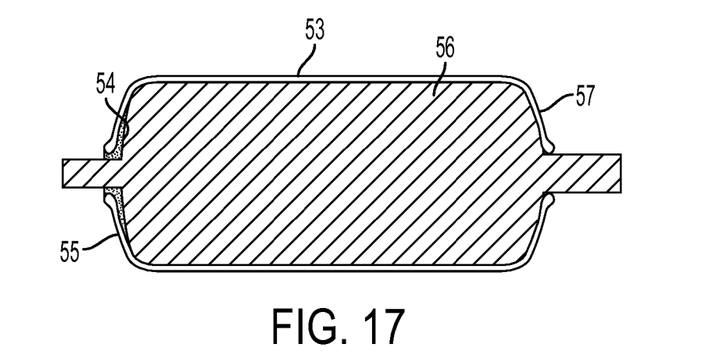
Figure 18:
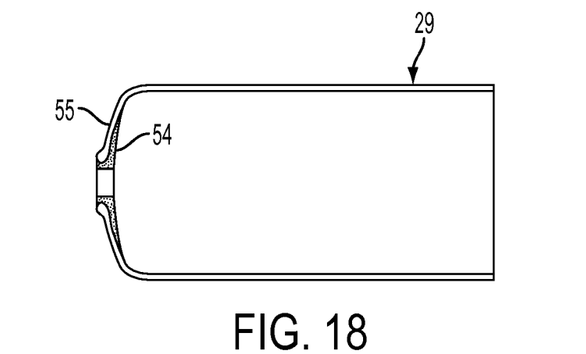
Figure 19:
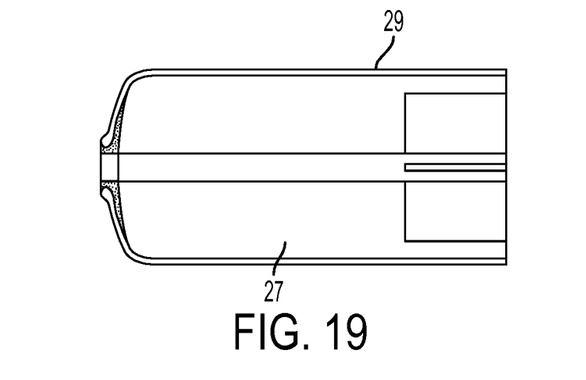

Furthermore, as illustrated in FIG. 17, a secondary composite structure 53, fitted with a polar seat 54 at its forward end 55, is wound on another mandrel 56. It may, for example, be made of a single winding layer having a slight angle of winding. This secondary structure 53 is then polymerized; then, once its rear extremity 57 is sectioned, it is unmolded so as to form the secondary structure 29 (FIG. 18).

Figure 16:
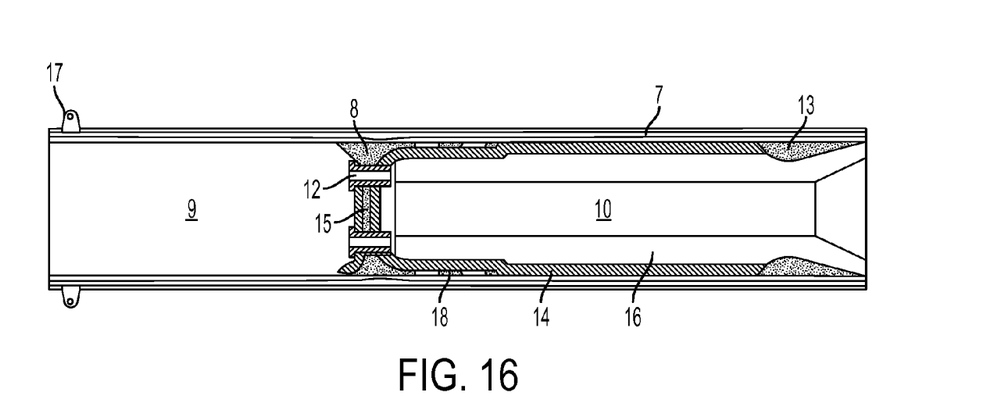

The semi-solid propellant block is molded inside of the secondary structure 29 (FIG. 19); next, this secondary structure is positioned and bonded in the chamber 9 of the structure shown in FIG. 16, so as to form the ramjet engine 3 illustrated in FIGS. 1 and 2.

A variant embodiment of the ramjet engine in accordance with the invention, containing a liquid fuel tank similar but not identical to the tank 33 shown in FIG. 6, will now be described with reference to FIGS. 20 to 33.

Figure 20:
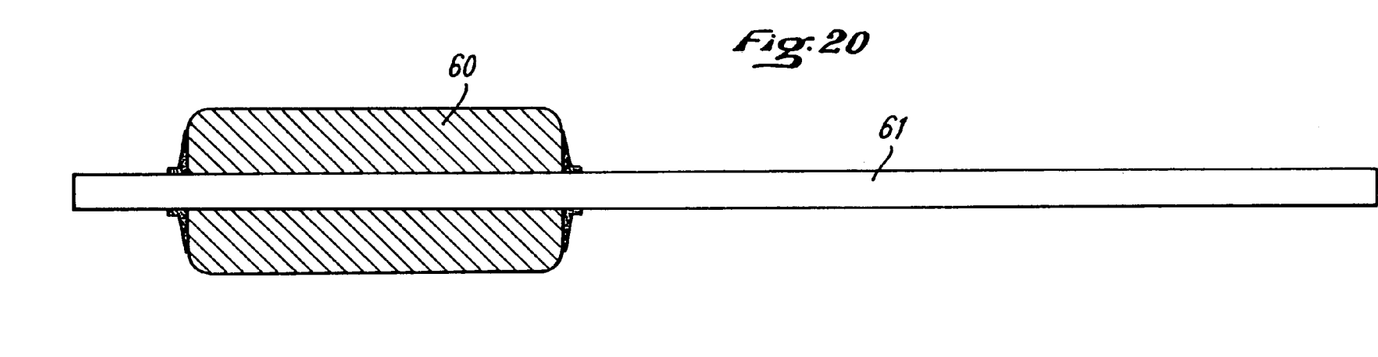
FIGS. 20 to 33 are diagrammatic representations of an example of a process for constructioning another ramjet engine in accordance with the present invention.

A mandrel 60 equipped with a projecting shaft 61 is constructed for manufacture of the ramjet-engine fuel tank. This mandrel may be either a soluble mandrel or a cylindrical volume made of an very thin aluminum alloy. The cylindrical volume, which forms a permanent, integral part of the finished tank, makes it possible to obtain a high degree of impermeability, in the event it is feared that the composite to be wound thereafter cannot perform this function (FIG. 20).

Figure 21:
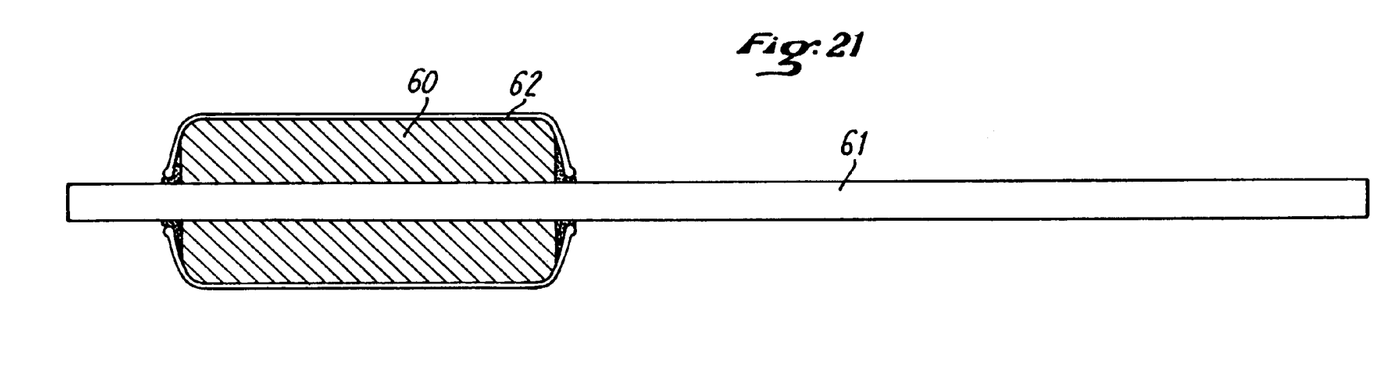
Figure 22:
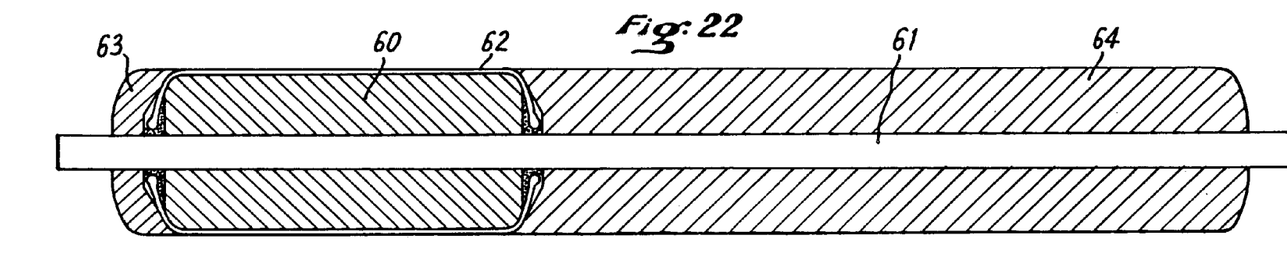

The resistant structure 62 of the fuel tank is constructed by a filament winding of resistant fibers impregnated with the same resin as that to be used to construct the tubular element 7 (FIG. 21).

Figure 23:
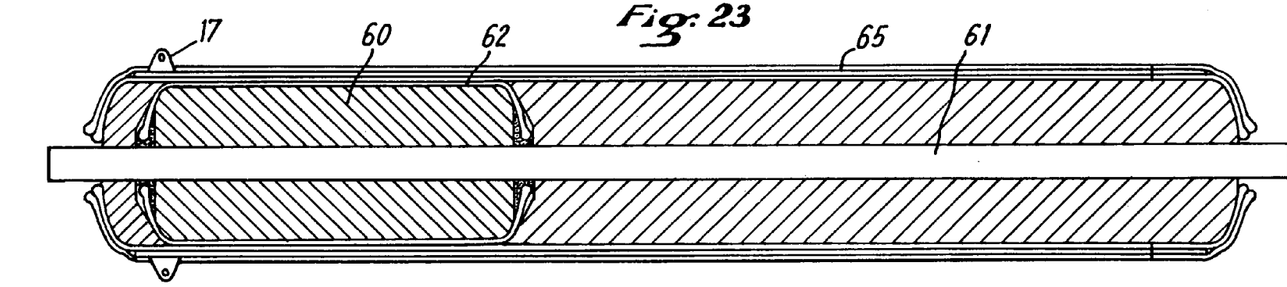

Two additional pieces of the mandrel 63 and 64 are mounted on the shaft 61 at either end of the tank 62 wound in this manner (not yet polymerized); a main structure 65 (analogous to structure 50 in FIG. 12) is constructed by filament winding on the large mandrel 60, 63, 64 thus obtained (FIG. 23). All metal inserts (such as 17) required for mounting various assemblies (air intakes, control surfaces, etc.) are added during this winding procedure.

The assembly made up of the main structure 65 and the fuel tank 62 is polymerized.

Figure 24:
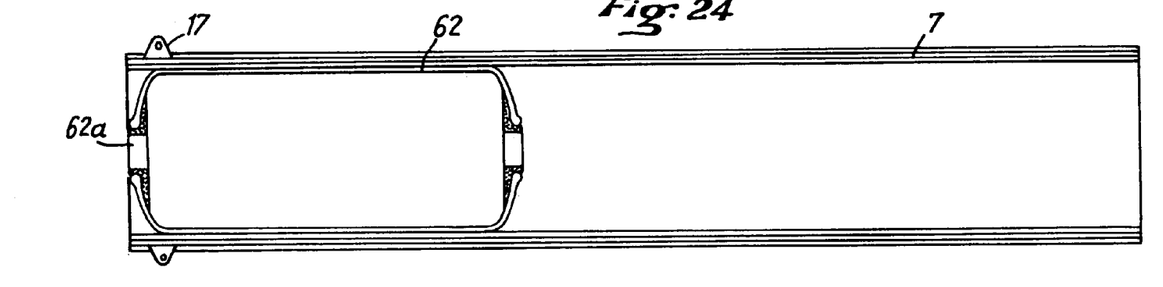

Following the sectioning of the ends created by the winding of the main structure 65, the two additional mandrel pieces 63 and 64 are unmolded. The assembly 7, 17, 62, illustrated in FIG. 24 is then obtained.

Figure 25:
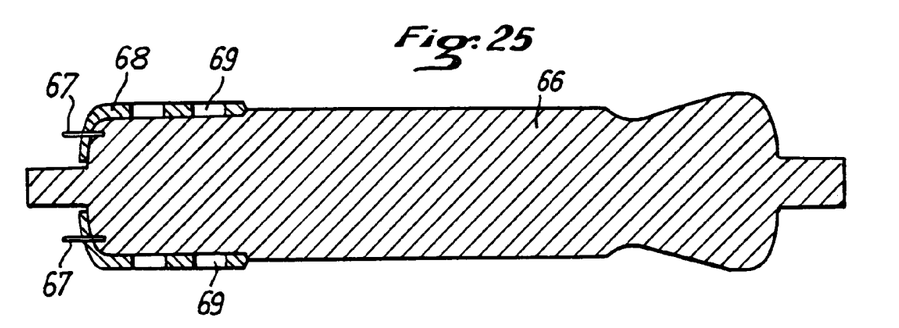
Figure 26:
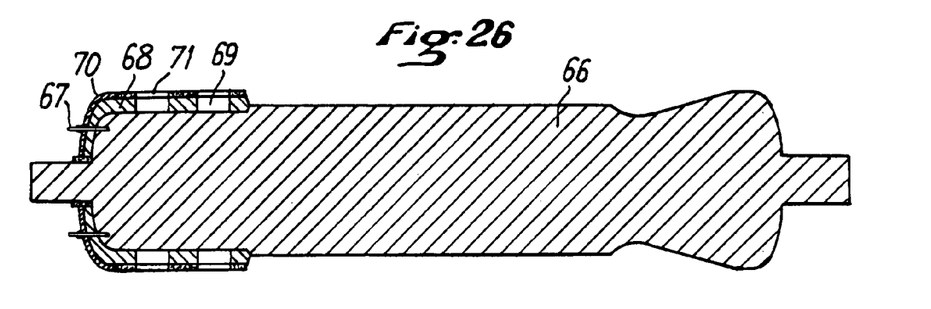

In addition, a mandrel 66 which is either soluble or dismountable using keys is made in the exact shape of the ramjet engine combustion chamber yet to be built. The combustion chamber will be built on this mandrel, and will contain, in addition, the integrated accelerator. Shaft 67, which will give material existence to the apertures required for the insertion of the injectors, are positioned in the forward end of the mandrel.

A hood made of silica fibers, impregnated with resin, and in which openings 69 have been cut corresponding to the air intakes 20a, 20b, is positioned on the front portion of the mandrel 66. Next, a cover designed to form the intermediate partition 8 is placed over the hood. This cover 70 contains openings 71 matching the air intakes 20a, 20b (FIG. 26), and the cover 70 may either be made of metal or molded by compression of a high-performance resin loaded with suitably-placed carbon fibers. Various parts, such as those required for mounting the injectors and the ignition device (not shown), are inserted.

Figure 27:
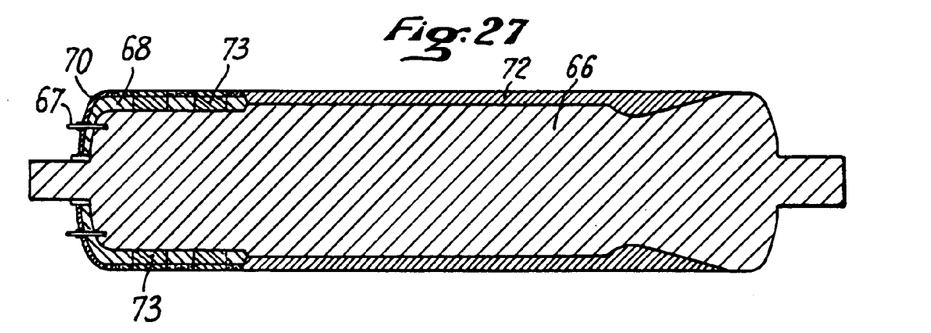

Silica fibers impregnated with resin are wound on the remaining cylindrical part of the mandrel 66, so as to form a lining 72 (FIG. 27). Thus, thermal protection 14 is provided by the hood 68 and the lining 72.

Disks 73 made of polymerized thermal protective material are placed in the air-intake opening (FIG. 27).

Figure 28:
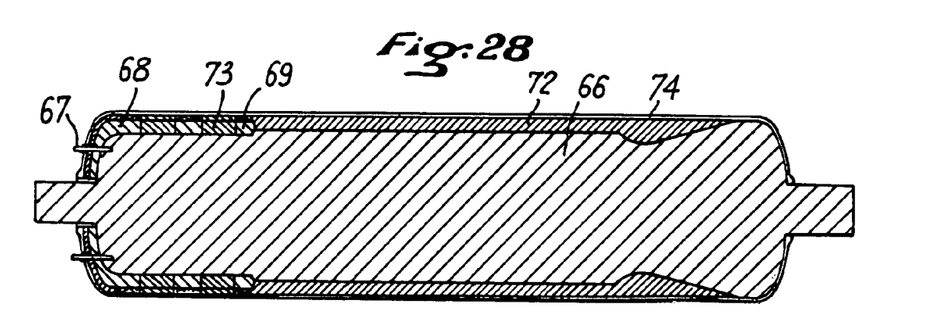

A thin wrapping 74, covering all of these components, is created by low-angle filament winding of carbon fibers. The purpose of this wrapping 74 is to join all of the components forming a module 75 designed to be inserted in the combustion chamber (FIG. 28).

Figure 29:
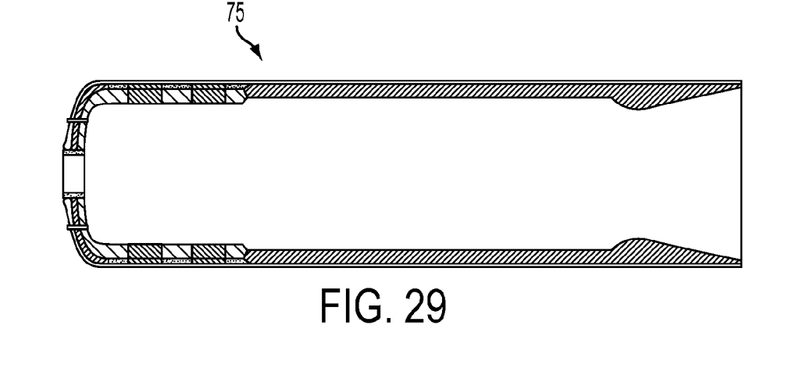
Figure 30:
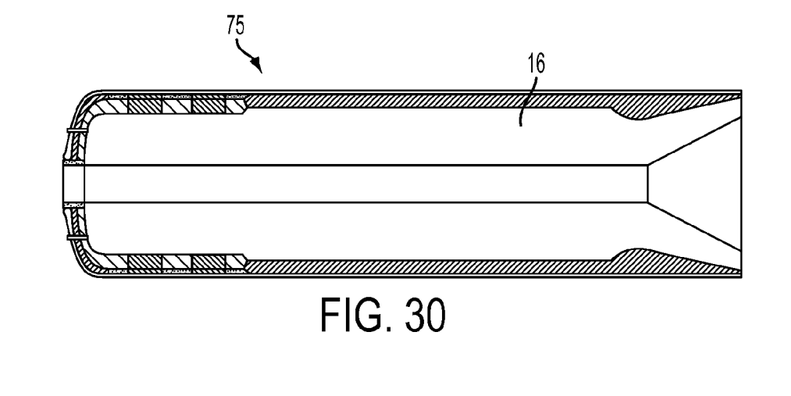

The assembly described above is polymerized; next, once the rear extremity of the wound wrapping is cut away, the mandrel is dissolved or taken apart and withdrawn from the module 75 of the combustion chamber thus formed (FIG. 29).

Figure 31:
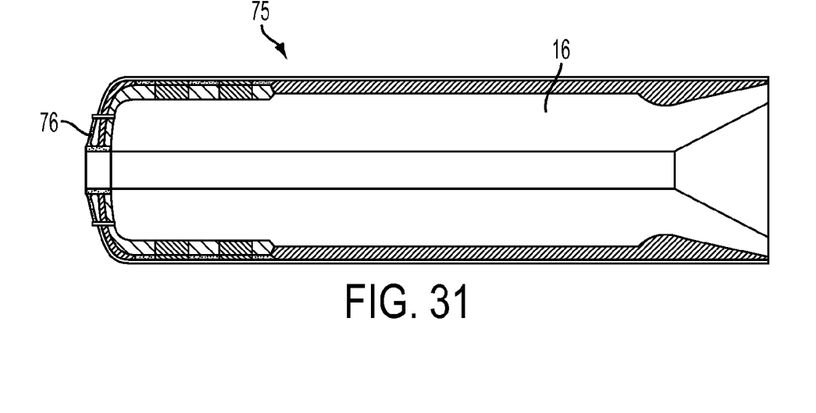

An acceleration propellant block 26 is then molded in the module 75 of the combustion chamber (FIG. 30), after which the cover 70 is fitted with an injection system 76 (FIG. 31).

Figure 32:
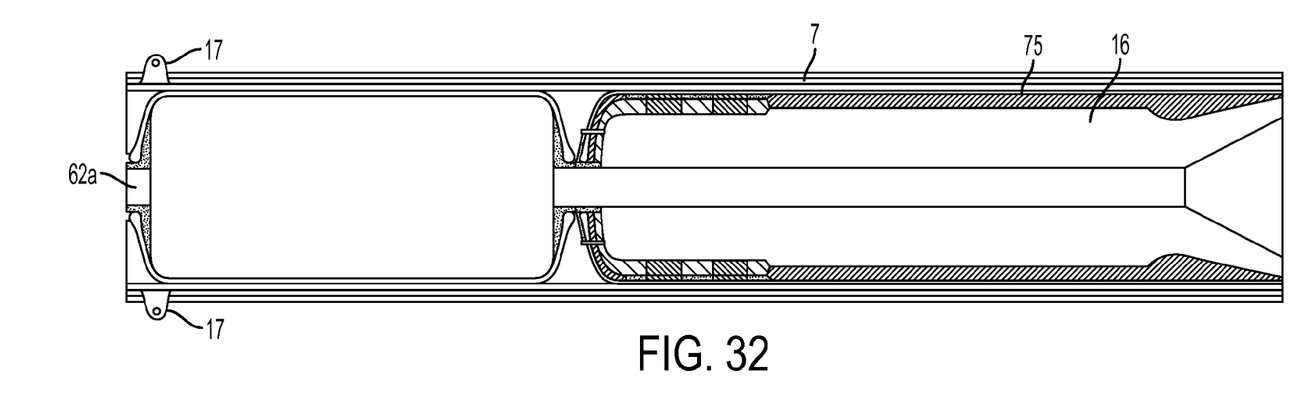

The module 75, thus equipped with the integrated accelerator 16 and the injection system 76, is slid into the structure shown in FIG. 24. Care is taken to position the air-intake apertures correctly. The assembly is then cemented (FIG. 32).

Figure 33:
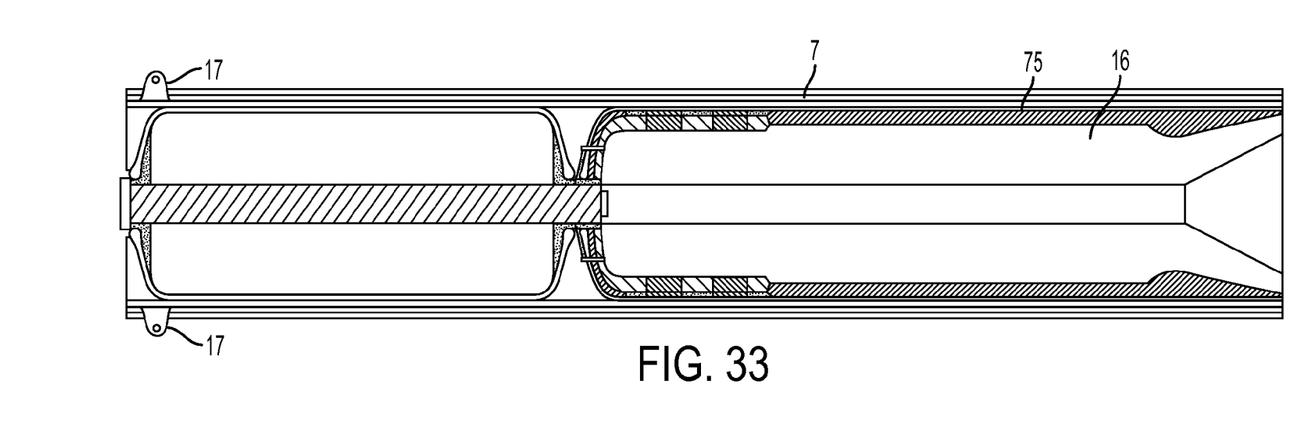

The cruising unit 11 is then completed through the forward opening 62a cut by the shaft 61 in the tank 62 (FIG. 33).

The invention claimed is:

1. Ramjet engine comprising a combustion chamber, a gas ejection nozzle provided at an end of said combustion chamber, a cruising propulsion means for feeding gaseous fuel into said combustion chamber, at least one air duct means for feeding combustion air into said combustion chamber, a rigid tubular element, an intermediate traverse partition means for dividing said tubular element into two spaces in such a manner that one of said spaces houses said cruising propulsion means and the other space houses said combustion chamber, and passage is cut in said intermediate traverse partition means for feeding of said gaseous fluid into said combustion chamber, wherein said at least one of air duct means is mounted on said tubular element so as to feed the combustion air through the tubular wall of said tubular element, said tubular element is made of a composite material composed of resistant fibers coated with a polymerized synthetic resin and includes insert means for enabling an attachment of an end of said at least one duct means to the tubular element in a vicinity of said combustion chamber, wherein pyrotechnic fuse means are provided for cutting openings in said combustion chamber through which openings said at least one air duct means communicates with the combustion chamber, and wherein said insert means are shaped so as to act as cutting knives to cut the wall of the tubular element upon actuation of the pyrotechnic fuse means.

2. Ramjet engine according to claim 1, wherein said intermediate traverse partition means is directly unitary with said rigid tubular element.

3. Ramjet engine according to claim 1, wherein said intermediate traverse partition means is joined to said rigid tubular element by one of said cruising propulsion means and said combustion chamber.

4. Ramjet engine according to one of claims 1, 2 or 3, wherein at least one of said cruising propulsion means and said combustion chamber is formed within said tubular element.

5. Ramjet engine according to one of claims 1, 2 or 3, wherein at least one of said cruising propulsion means and said combustion chamber is constructed as a module positioned and attached in said tubular element.

6. Ramjet engine according to one of claims 1, 2 or 3, wherein said tubular element is constructed around at least one of said cruising propulsion means and said combustion chamber.

7. Ramjet engine according to claim 6, wherein at least one of said cruising propulsion means and said combustion chamber are ready for use and are incorporated into the tubular element during a construction of the tubular element.

8. Ramjet engine according to claim 6, wherein at least one of said cruising propulsion means and said combustion chamber are made of a composite material and are polymerized at the same time as said tubular element.

9. Ramjet engine according to claim 1, wherein said insert means are unitary with said intermediate transverse partition means.

10. Ramjet engine according to one of claims 1, 2 or 3, wherein said combustion chamber contains a consumable accelerator.

\* \* \* \* \*